US010315350B2

(12) United States Patent
Clüsserath et al.

(10) Patent No.: US 10,315,350 B2
(45) Date of Patent: Jun. 11, 2019

(54) STRETCH ROD FOR THE FORM-AND-FILL HEAD OF A MACHINE FOR FORMING AND FILLING CONTAINERS PRODUCED FROM PREFORMS

(71) Applicant: KHS Corpoplast GmbH, Hamburg (DE)

(72) Inventors: Ludwig Clüsserath, Bad Kreuznach (DE); Michael Linke, Hamburg (DE); Michael Litzenberg, Geesthacht (DE); Rolf Baumgarte, Ahrensburg (DE); Gerhard Klöpper, Hamburg (DE); Niels Meyer, Schenefeld (DE)

(73) Assignee: KHS Corpoplast, GmbH, Hamburg (DE)

( * ) Notice: Subject to any disclaimer, the term of this patent is extended or adjusted under 35 U.S.C. 154(b) by 55 days.

(21) Appl. No.: 15/531,942

(22) PCT Filed: Dec. 3, 2015

(86) PCT No.: PCT/EP2015/002434
§ 371 (c)(1),
(2) Date: May 31, 2017

(87) PCT Pub. No.: WO2016/087044
PCT Pub. Date: Jun. 9, 2016

(65) Prior Publication Data
US 2017/0312973 A1    Nov. 2, 2017

(30) Foreign Application Priority Data
Dec. 4, 2014    (DE) .................. 10 2014 017 871

(51) Int. Cl.
*B29C 49/12*    (2006.01)
*B29C 49/42*    (2006.01)
(Continued)

(52) U.S. Cl.
CPC .......... *B29C 49/12* (2013.01); *B29C 49/4273* (2013.01); *B65B 3/022* (2013.01);
(Continued)

(58) Field of Classification Search
CPC ........ B29C 2049/1295; B29C 49/4273; B29C 2049/4294
See application file for complete search history.

(56) References Cited

U.S. PATENT DOCUMENTS 4,039,641 A    8/1977  Collins
5,403,177 A *  4/1995  Priest .................... B29C 49/062
                                                    264/532
(Continued)

FOREIGN PATENT DOCUMENTS

DE    102013102563 A1    9/2014
DE    102015110073 A1    12/2016
(Continued)

*Primary Examiner* — Robert B Davis
(74) *Attorney, Agent, or Firm* — Rankin, Hill & Clark LLP

(57) ABSTRACT

The invention relates to a stretch rod for the form-and-fill head of a machine for forming and filling of containers produced from preforms. The object of the invention is to devise a stretch rod of this type which can be cleaned and/or disinfected without being disassembled and without any other intervention. According to the invention, the object is achieved by a stretch rod (5) for the form-and-fill head (3) of a machine for forming and filling (molding and filling) of containers produced from preforms (2), which rod comprises a drive unit for axially moving said stretch rod (5). At least the part (6) of the drive unit which is connected to the stretch rod (5) is arranged in a drive chamber (11) which is sealed off from the regions of the form-and-fill head (3) which come into contact with the filling material (the material with which the container is being filled). The
(Continued)

inventive stretch rod is characterized in that the sealing action is achieved by a seal (12) which surrounds the stretch rod (5).

12 Claims, 14 Drawing Sheets

(51) Int. Cl.
    *B65B 3/02*     (2006.01)
    *B65B 3/14*     (2006.01)
    *B29L 31/00*     (2006.01)

(52) U.S. Cl.
    CPC ........ *B65B 3/14* (2013.01); *B29C 2049/1295* (2013.01); *B29C 2049/4294* (2013.01); *B29L 2031/712* (2013.01)

(56) References Cited

U.S. PATENT DOCUMENTS

| | | | |
|---|---|---|---|
| 8,435,024 B2* | 5/2013 | Dordoni | B29C 49/12 264/525 |
| 8,602,771 B2 | 12/2013 | Eudier et al. | |
| 2011/0287126 A1* | 11/2011 | Geltinger | B29C 49/12 425/522 |
| 2012/0266567 A1 | 10/2012 | Haesendonckx et al. | |
| 2012/0326359 A1 | 12/2012 | Neubauer et al. | |

FOREIGN PATENT DOCUMENTS

| | | |
|---|---|---|
| EP | 1484160 A1 | 12/2004 |
| WO | 2011030183 A1 | 3/2011 |
| WO | 2014019691 A2 | 2/2014 |
| WO | 2014173870 A1 | 10/2014 |
| WO | 2014191515 A1 | 12/2014 |

* cited by examiner

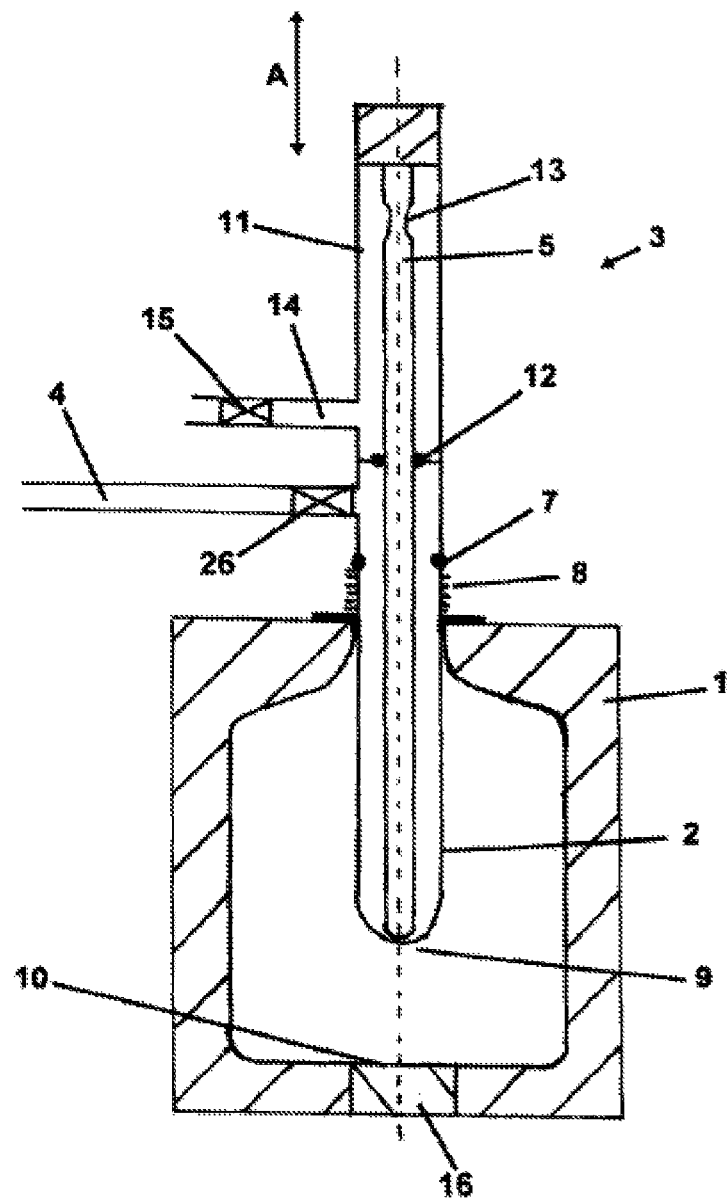

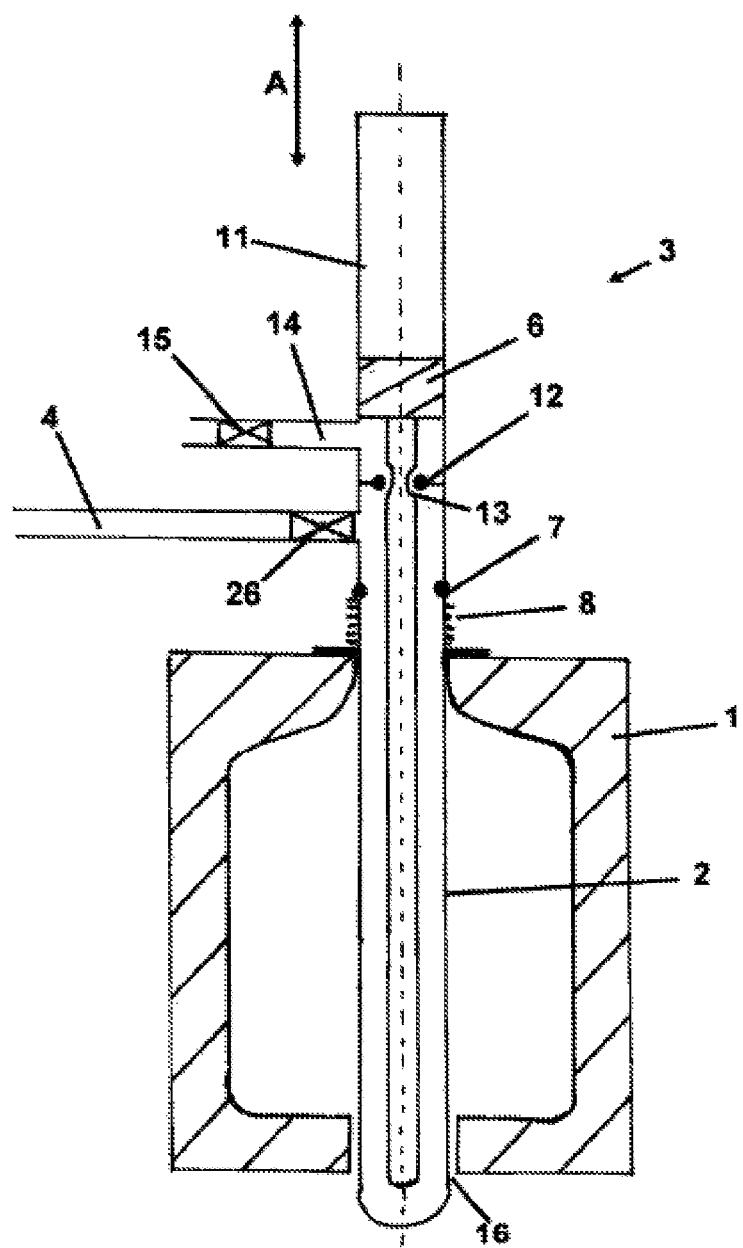

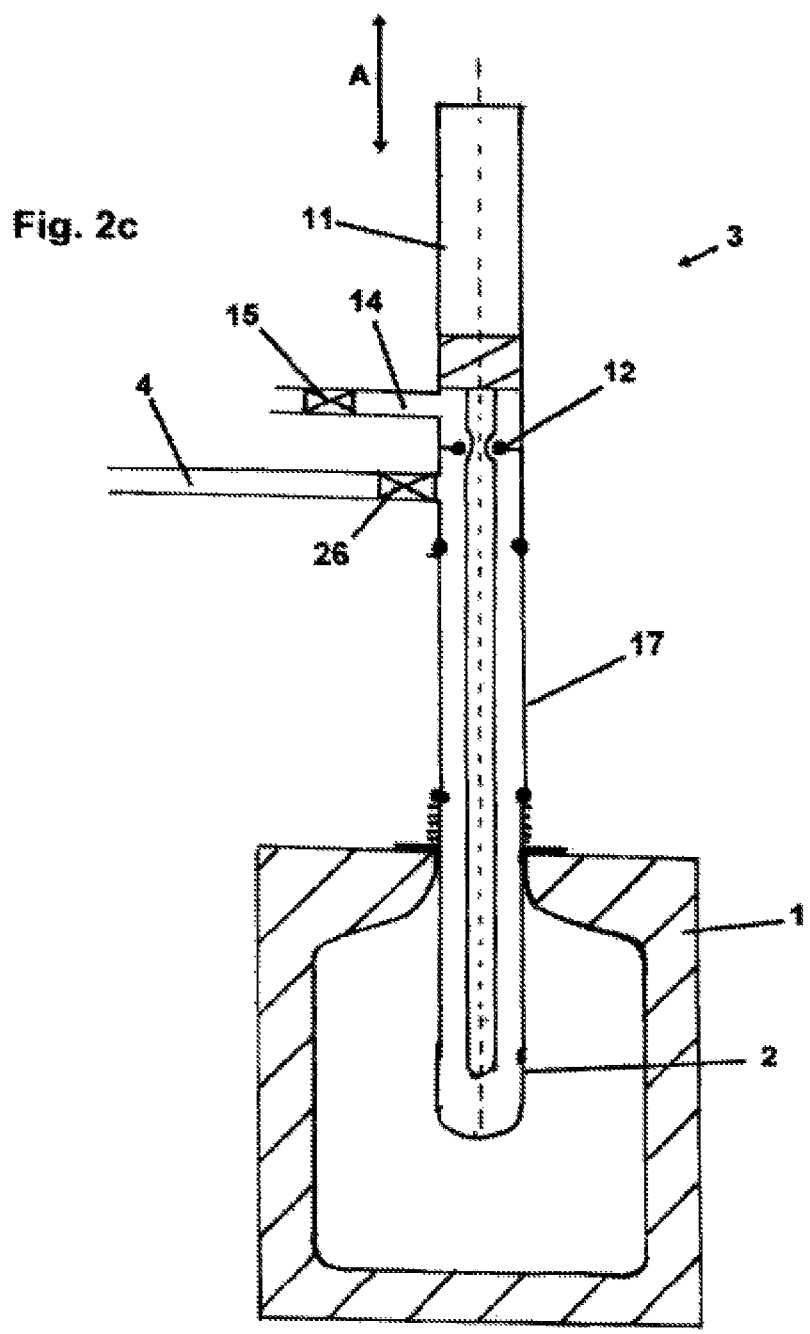

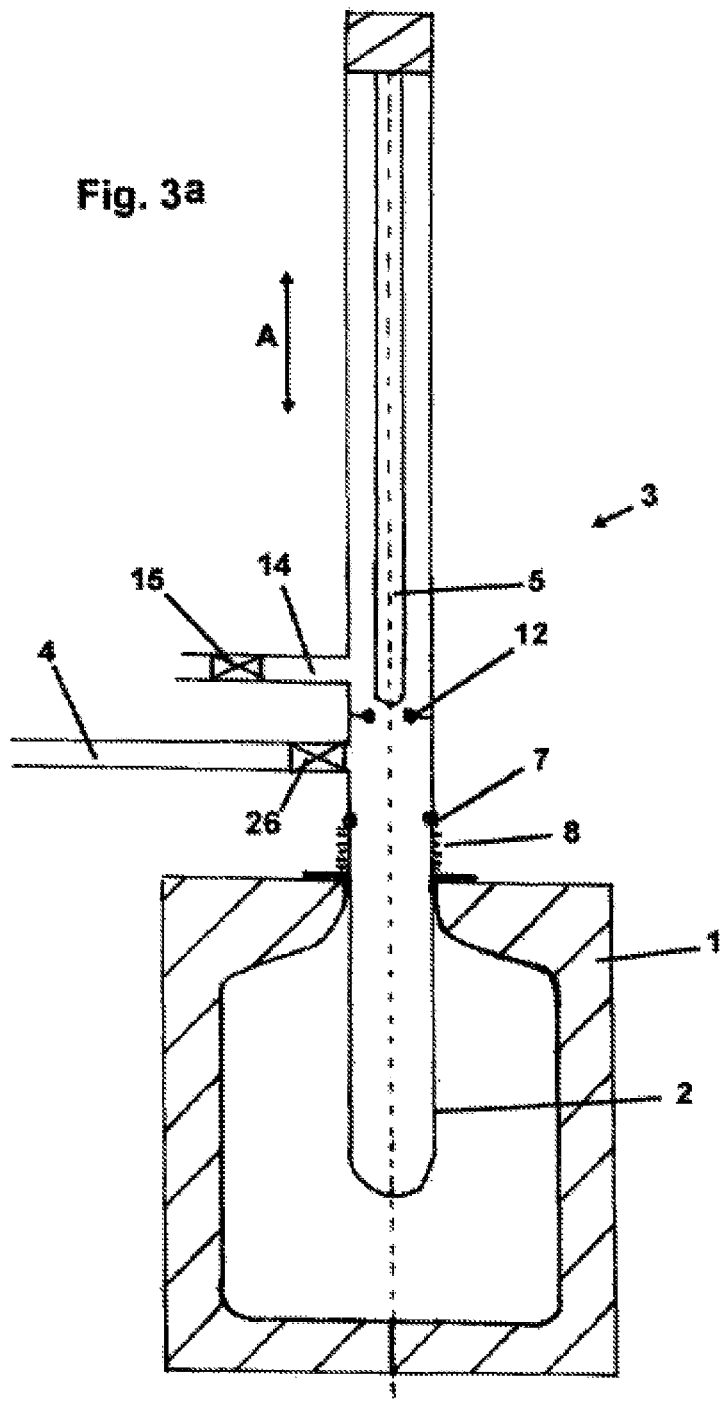

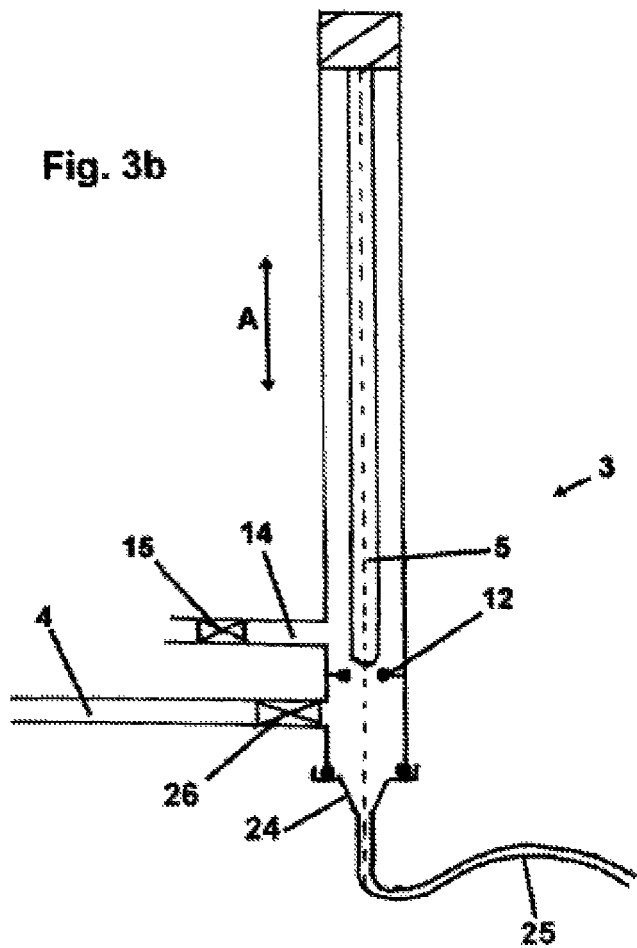

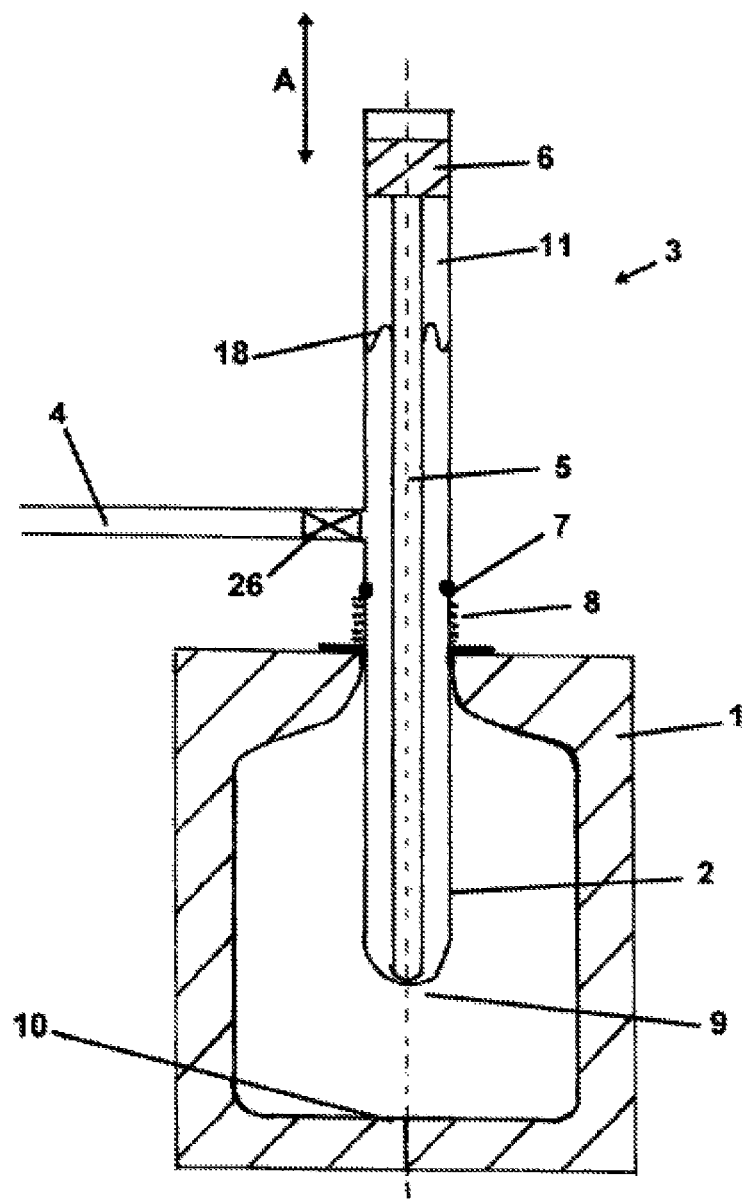

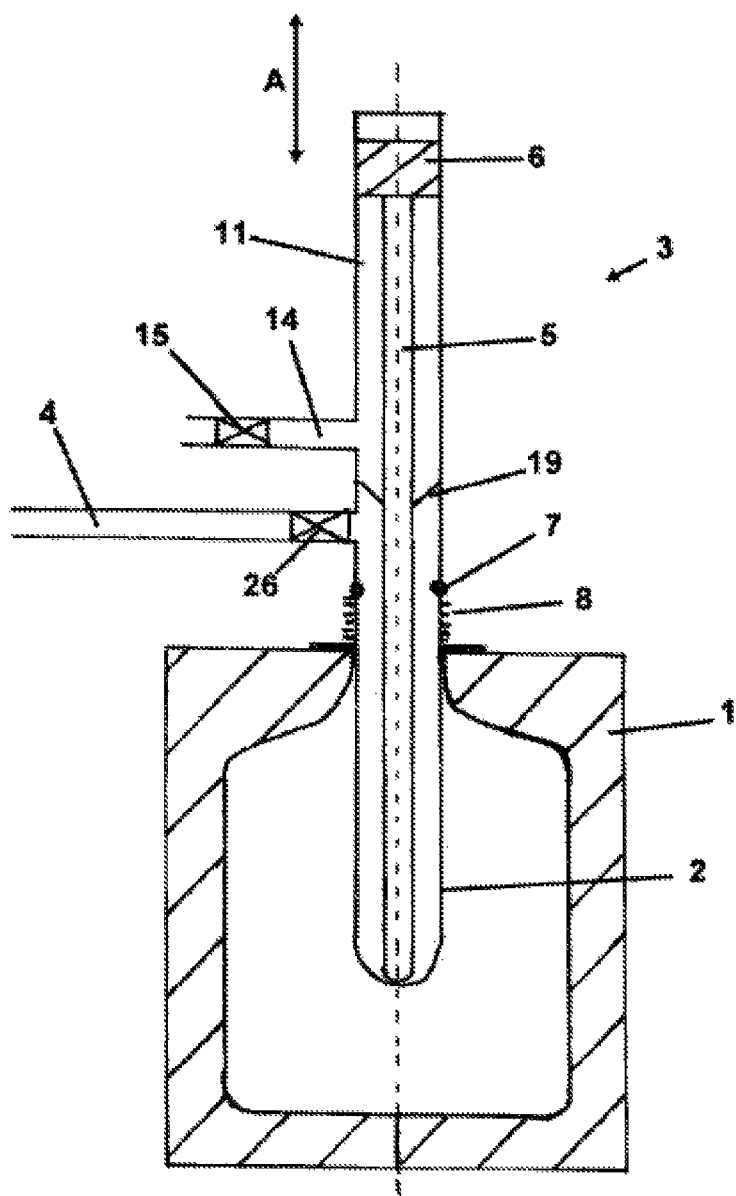

STRETCH ROD FOR THE FORM-AND-FILL HEAD OF A MACHINE FOR FORMING AND FILLING CONTAINERS PRODUCED FROM PREFORMS

The present invention relates to a stretch rod for the form-and-fill head of a machine for forming and filling (molding and filling) of containers produced from preforms.

It is customary practice for containers, particularly bottles, to be formed in a blow molding process by means of a forming gas which flows under pressure into a preheated preform, wherewith in a second step the containers are filled with a filling material, particularly a liquid filling material. To rationalize the process, in the recent period methods have been developed wherein the preheated preform undergoes forming not by a pressurized gas but by the liquid filling material itself, under pressure, in a single step in which the preform can also be filled. Such a method is disclosed, e.g., in DE 10 2010 007541 A1.

Preforms for known methods are comprised of a thermoplastic plastic, e.g. PET, PE, or PP, and are typically fabricated in an injection molding process. For re-forming to form a container, it is not significant whether the preform is stored in advance of the re-forming or is introduced to the re-forming process immediately after it is fabricated.

To enable the preform to be re-formed into a container, it is treated thermally, e.g. is heated and is treated with a suitable temperature profile. E.g. the body of the preform is heated to ca. 120° C., and can undergo forming even though (as is desirable) the temperature in the mouth region is not raised above appreciably lower temperatures, for the reason that the preform in its mouth region is held in the forming and filling machine, being held under the holding forces customarily employed there, and should not itself be deformed during the forming process.

The forming and filling process is carried out with simultaneous forming and filling of containers by feeding a filling medium (filling material) into a forming and filling machine, which customarily has a plurality of forming and filling stations, which stations may be disposed, e.g., on a rotating rotor structure. Each forming and filling station has a form-and-fill head and a mold. A preform is inserted in the mold, following which the form-and-fill head is sealingly applied to the mouth of the preform, allowing filling material to now be fed through the form-and-fill head under elevated pressure. In addition, a stretch rod, including its drive means, is disposed on the form-and-fill head.

As a rule, the forming process is initiated by axial stretching of the premold by the stretch rod, which rod can be moved in the axial direction in order to exert a force on the bottom of the premold. Depending on the force applied, the premold can be actively stretched in the axial direction; or the stretching process is only started and then is continued by feeding of the molding medium under pressure; or the container which is being formed is only guided during the forming process, whereby the container can be simultaneously formed and the "bubble" which is being formed cannot be displaced laterally.

In classical blow molding methods, in which the forming and filling of the container are carried out in separate process steps and different sections of the apparatus, the stretch rod is not subjected to cleaning. The situation is different in methods for simultaneous forming and filling of a container, in which the stretch rod comes into contact with the filling material; or in methods in which the forming and filling phases overlap, and the stretch rod contacts (is immersed in) the filling material. Particularly when filling beverages in beverage bottling apparatus, stringent hygienic requirements are applied to the process. These include regular cleaning and disinfection. Hereinafter, these hygienic processes will be referred to simply as "cleaning". The disinfecting aspect will be a regular part of the cleaning, whether carried out in a common step or a separate step.

It is desirable for the cleaning to be carried out as quickly as possible, to avoid idle time of the affected apparatus. In addition, it is desirable to avoid actual physical intervention into an apparatus, e.g. by disassembly or de-mounting of parts for cleaning and disinfection, so as to avoid contamination of an apparatus by externally introduced germs. The areas of an apparatus which serve to guide the filling material should be isolated from the environment to the extent possible and should be cleanable without opening.

Various processes for so-called CIP (cleaning in place) have been developed for cleaning and disinfection of such apparatuses without any appreciable disassembly, wherein component parts are left in place.

In any event, cleaning and disinfection of the stretch rod are difficult. The drive unit of the stretch rod often has a complex structure, and must be de-mounted in order to carry out cleaning.

Accordingly, the object of the present invention is to devise a stretch rod for the form-and-fill head of a machine for forming and filling of containers produced from preforms, which can be cleaned and/or disinfected without disassembly of the stretch rod or any other intervention.

This object is achieved according to the invention by a stretch rod for the form-and-fill head of a machine for forming and filling of containers produced from preforms, which rod comprises a drive unit for axially moving said stretch rod. At least the part of the drive unit which is connected to the stretch rod is arranged, to the extent possible, in a drive chamber which is sealed off from the regions of the stretch rod which come into contact with the filling material. The inventive stretch rod is characterized in that the sealing is achieved by a seal means which surrounds the stretch rod.

With the inventive configuration, it is possible to provide a form-and-fill head which is cleanable by CIP processes. The drive means of the stretch rod are disposed in a drive chamber which is isolated with respect to the regions of the form-and-fill head which guide the filling material, and said drive means are not contaminated by the filling material. Therefore, it is unnecessary to perform cleaning of this region.

To carry out a CIP cycle, the procedure may be, e.g., as follows: A preform is inserted in the mold, but cleaning medium is fed instead of the filling material. Customary pressures for cleaning are below 2 bar, and thus the preform is not deformed. The cleaning medium passed through the system is collected in the preform, and can be disposed following the conclusion of the cleaning cycle. Customary preforms may be used, or special preforms designed (or provided) for the cleaning cycle may be used which have, e.g., a greater volume, in order to be able to collect a greater quantity of cleaning medium.

According to a preferred embodiment of the invention, the drive chamber is sealed with a seal having a sealing surface which is in a fixed position and surrounds the stretch rod. This seal may comprise a cylindrical bellows, roll bellows, or expandable sleeve, e.g. an elastomer sleeve. The other sealing surface is on the form-and-fill head, so that the drive chamber is tightly sealed. A bellows of a type described in DE 10 2015 110073.8 may be advantageously employed.

Preferably the seal is so configured that in a certain position of the stretch rod (when the stretch rod is in a certain position) the seal is free of folds to the extent possible, so that during a CIP process the seal can be well rinsed by the cleaning medium. If a bellows or roll bellows is being employed, this position would be the position in which the stretch rod is extended, with the bellows being stretched (extended) or the roll bellows being unrolled. In the case of a sleeve-type seal, the seal may be configured such that when the stretch rod is in the starting position the seal is substantially or completely free of folds.

Alternatively, the stretch rod may be axially movable relative to the seal. In order to be able to adequately clean the seal, it may be possible, e.g., for the stretch rod to be moved into a position, for a cleaning process, in which the rod is not in contact with the seal. Then, the seal can have cleaning medium passed around it, in a CIP cycle.

For the CIP one may arrange, e.g., for the stretch rod to be moved upward to the extent that it is moved out of the seal.

According to another embodiment, the stretch rod may have an encircling groove in a region which does not come into contact with the seal during the stretching process. The groove may be above or below the region which contacts the seal during the stretching process, in particular it may adjoin said region. The stretch rod can then be moved upward slightly beyond its starting position, or downward slightly below its ending position, in order to assume a "cleaning position".

If the groove is located above the area in contact with the seal during the stretching process so that it has to be moved further downward for cleaning purposes, further precautions must be taken for the cleaning process. Since the stretching rod already comes into contact with the bottom of the mold (i.e. as far as the wall thickness of the container being formed), an opening in the bottom of the mold must be provided for further movement of the stretching rod, which provides an additional path for the stretching bar to be moved. The opening must have a diameter which is at least that of the stretching rod and preferably at least that of a preform which can be inserted into the forming and filling station, for the cleaning process. In the described case, special preforms must be used for the cleaning process, which are long enough to accommodate the stretching bar when it is moved beyond its end position.

Alternatively, it is possible to employ a preform with a higher mouth region, or to use an additional cap for the cleaning process, which cap is disposed between the mouth of the preform and the form-and-fill head, thereby allowing the stretch rod to be extended farther in the preform. It should be understood that all of the described variants may be employed independently or in other combinations, thus e.g. special premolds or molds may be employed which have an opening for cleaning the stretch rod in its initial position or above that position.

According to an alternative embodiment employing a stretch rod which is axially movable relative to the seal, a seal is employed which is resistant to pressure on one side. Such seals may be configured, in particular, as lip seals. On one side they are resistant to pressure, and in the other direction they are permeable when pressure is applied. Such seals may be configured, e.g., such that they withstand a forming and filling pressure of up to 40 bar on one side, whereas in the other direction a pressure of ca. 2 bar is sufficient to open them. During the forming and filling process, the seal seals the drive chamber against the filling material at a high pressure. During a cleaning process, the cleaning medium is passed into the drive chamber at a somewhat lower pressure. The seal is stressed from the other side, and is opened. It loses its contact with the stretch rod, and the cleaning medium can pass around the seal on all sides.

The drive unit of an inventive stretch rod may advantageously be comprised of—a magnetic coupling with a first magnet unit which is connected to the stretch rod, and—a second magnet unit,
wherein the first magnet unit is disposed in the drive chamber, and the second magnet unit is dispose outside the drive chamber. With this arrangement, the two magnet units function as a magnetic coupling. The second magnet unit may be disposed, e.g., externally on the form-and-fill head, and may be axially movable by suitable drive means. The first magnet unit, which is connected to the stretch rod, is coupled via the magnetic field, so that the stretch rod is moved as well.

One or both of the magnet units may be permanent magnets, or they may be comprised of coils. If coils are used, they may be mounted in a fixed location, and their magnetic fields may be controlled such that the stretch rod is moved in the manner desired.

Preferably, the first magnet unit is supported in the drive chamber in a manner such that it is disposed at a distance from the chamber walls, so that cleaning medium can be passed around it. This supporting may be by means of small support elements, e.g. three such elements, which have small contact areas with the chamber walls. Alternatively, the magnetic unit itself may have a form and dimensions such that it rests against the walls with its edges; in particular it may have a triangular, square, or rectangular shape.

Some exemplary embodiments of the invention will be described in more detail hereinbelow, with reference to the accompanying drawings.

FIGS. 2a to 2c illustrate schematically a second embodiment of an inventive stretch rod, in a cross sectional view;

FIGS. 3a and 3b illustrate schematically a third embodiment of an inventive stretch rod, in a cross sectional view;

FIGS. 4a and 4b illustrate schematically a fourth embodiment of an inventive stretch rod, in a cross sectional view;

FIG. 5 illustrates schematically a fifth embodiment of an inventive stretch rod, in a cross sectional view;

Figure 1A:
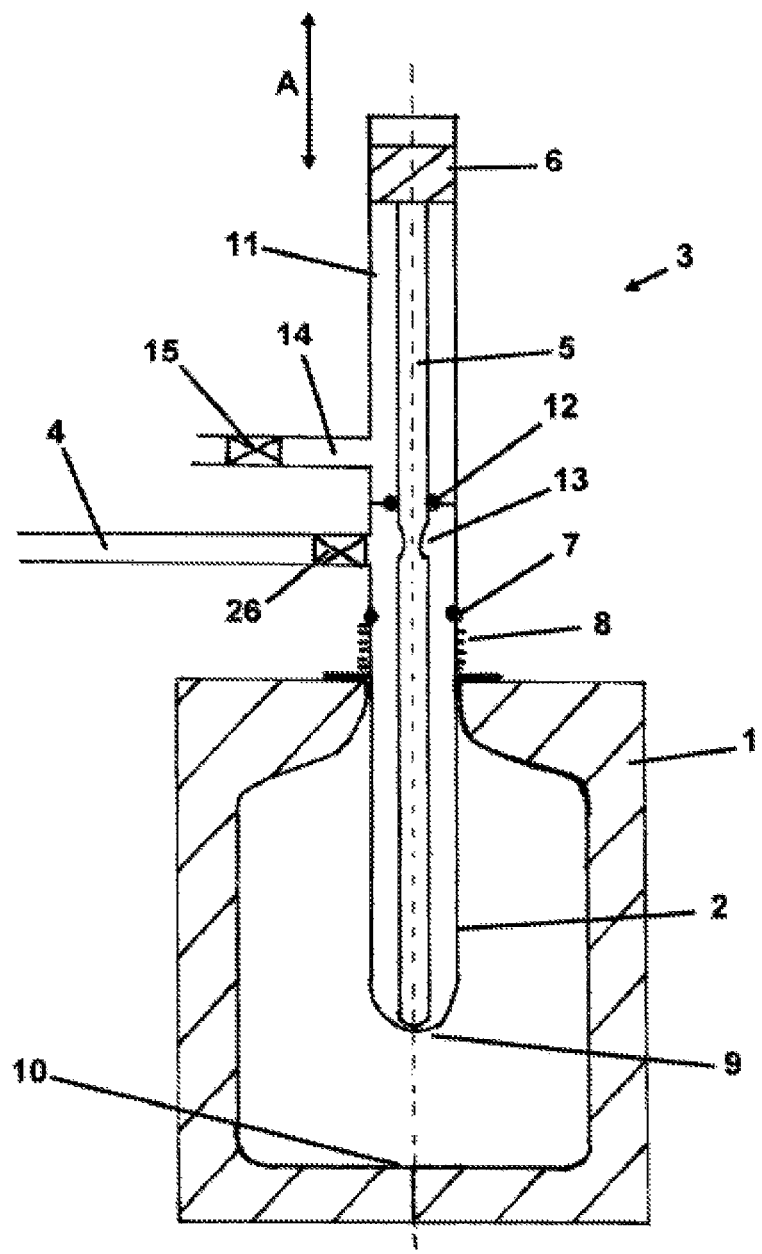
FIGS. 1a to 1c illustrate schematically a forming and filling station of a machine for simultaneous forming and filling of bottles produced (being produced) from preforms, with a first embodiment of a stretch rod which permits a CIP cleaning process, in a cross sectional view.
Figure 1B:
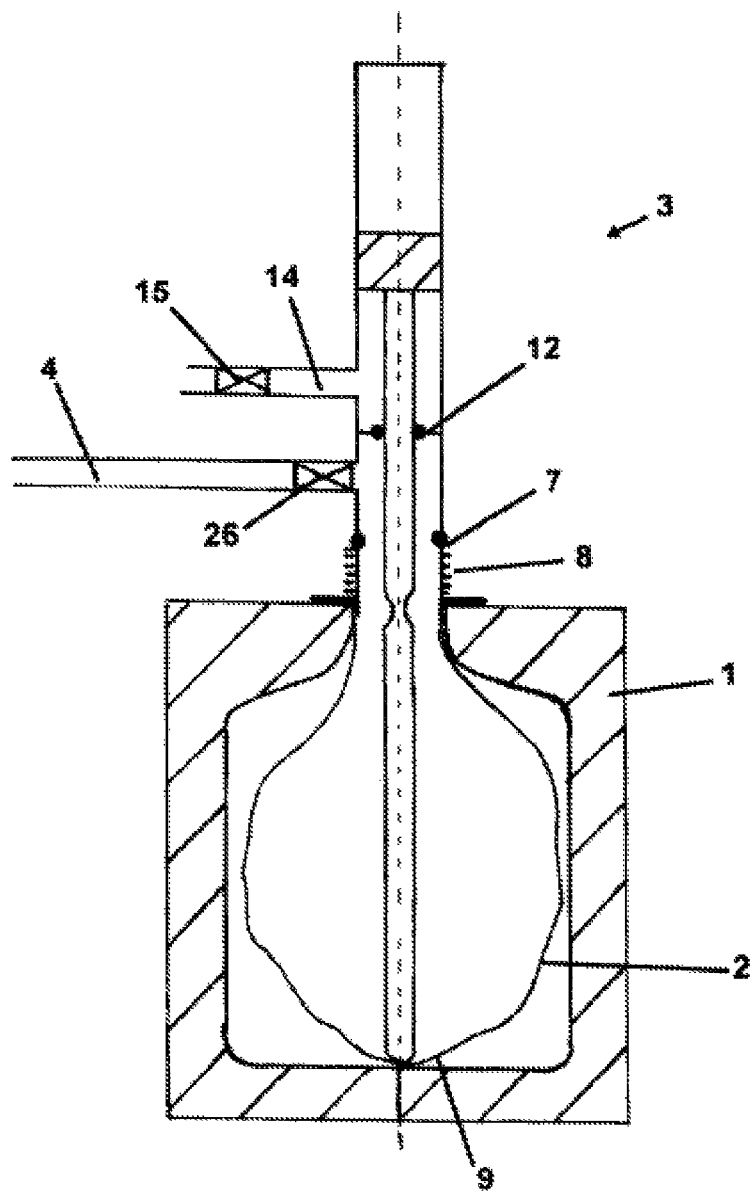
Figure 1C:
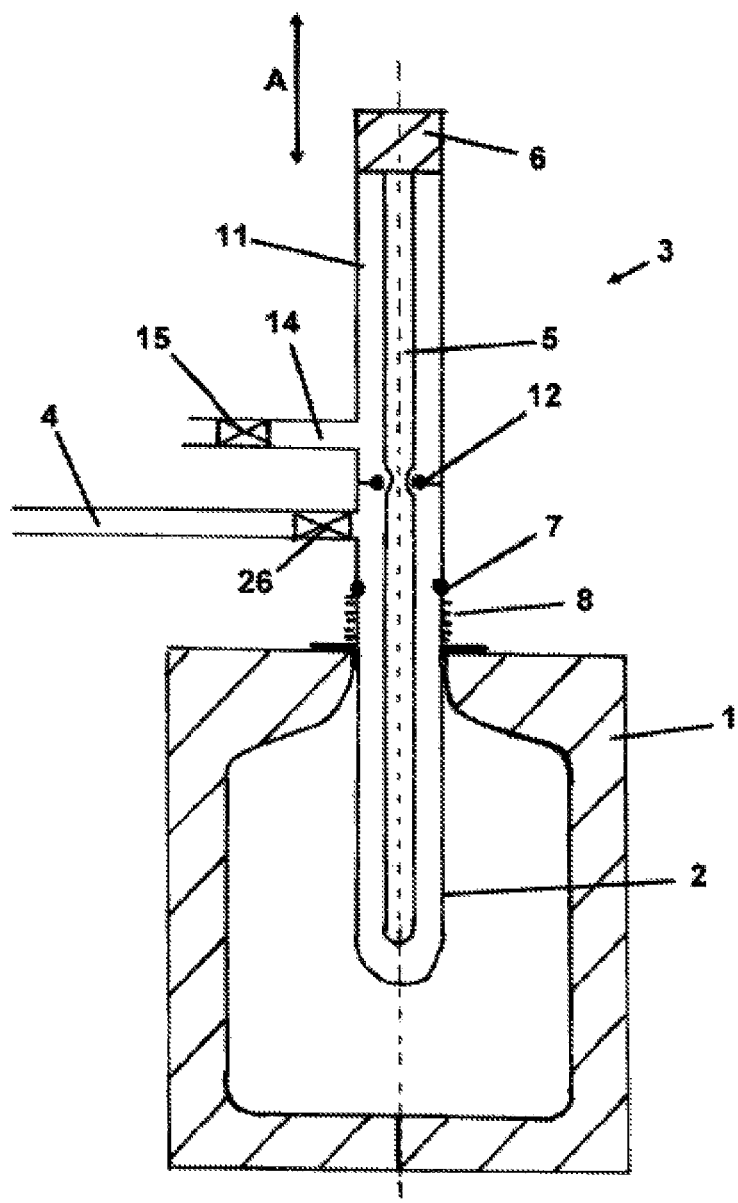

FIGS. 1a to 1c illustrate schematically a forming and filling station of a machine for simultaneous forming and filling of bottles produced from preforms. The forming and filling station is essentially comprised of the form-and-fill head 3 and the mold 1, within which mold a preform 2 undergoes forming to produce a container, by means of a filling material supplied under pressure.

FIG. 1a illustrates the start of the forming and filling phase, in which a preform 2 is inserted into a mold 1. The form-and-fill head 3 is comprised of a feed line 4 with a filling valve 26, for liquid filling material which is fed under high pressure, and a stretch rod 5 which can be moved in the axial direction A by means of a drive unit 6. The form-andfill head 3 is placed on the mouth 8 of the preform 1 in a manner such that a seal is achieved, by means of the seal 7.

At the start of the forming and filling phase, the stretch rod 5 rests against or almost rests against the bottom 9 of the preform 1. For forming and simultaneous filling of the container, then filling material is fed via the feed line 4 and through the opening of the filling valve 26, under pressure, and the stretch rod 5 is simultaneously forced downward in the axial direction toward the bottom 10 of the mold 1.

The stretch rod 5 is moved by means of the drive unit 6, not further described here, which is disposed in a closed drive chamber 11 which is closed off against the regions of the form-and-fill head which guide the filling material. In the exemplary embodiment shown, the drive chamber 11 is sealed against the regions of the form-and-fill head which guide the filling material, such sealing being by means of a seal 12 which surrounds the stretch rod 5.

As illustrated in FIG. 1b, the preform 2 is initially deformed to form a "bubble", in the course of the forming and filling process. As the deformation proceeds, it is limited by the wall of the mold 1, wherewith the container is formed. During the deformation of the preform, the stretch rod 5 guides the bottom 9 of the preform (namely the bottom of the container 2 undergoing forming), by persistently exerting a moderate stretching force on the bottom 9. As a result, the "bubble" which is being formed cannot be displaced laterally, and thus the forming of the container proceeds in a uniform manner.

It is necessary to clean the regions of the form-and-fill head 3 which guide the filling material, at regular intervals of time. For this purpose, these regions are rinsed with a cleaning medium; in this connection, a preform is inserted into the mold, unless one intends to clean the mold at the same time.

The inventive stretch rod can be brought into a position which allows complete cleaning without disassembly or de-mounting of apparatus parts. This position is illustrated in FIG. 1c. For the described purpose, the stretch rod 5 has an encircling constriction, in the form of a groove 13, in a region of the stretch rod which region is not contacted by the seal 12 during the stretching process. In the embodiment illustrated, the groove 13 is disposed below this region.

In order to make it possible for the seal 12 which surrounds the stretch rod 5 to be properly cleaned, the stretch rod can be moved into a position in which the seal 12 is aligned with the groove 13. For this purpose, the stretch rod 5 can be moved upward from its initial position. Under these circumstances, the seal 12 will no longer be in contact with the stretch rod 5. The stretch rod and the seal 12 will be completely accessible, and can be rinsed with the cleaning medium. For this, the cleaning medium may be introduced through either the filling material line 4 or the cleaning line 14, which cleaning line leads to the chamber 11 through the valve 15 (which may be a check valve), or through a combination of these.

The preform 2 used for the cleaning process may be an ordinary preform or may have a changed volume compared to ordinary preforms in order to be able to accommodate the volume of cleaning medium used for the cleaning. It is also possible to use a cap (not shown) instead of a preform, which cap preferably has a drain via which the cleaning medium can be diverted or can be recycled in a circulation loop.

The exemplary embodiment illustrated in FIG. 2a essentially corresponds to the exemplary embodiment according to FIG. 1a, but here the groove 13 is disposed above the region of the stretch rod which region is in contact with the seal during the "stretching" process.

The stretch rod can then be moved into a cleaning position, as illustrated in FIG. 2b, by moving it downward past its normal end position, so that the groove 13 and the seal 12 are aligned. Once again, a preform 2 for the CIP cleaning is inserted into the mold 1. Since according to this exemplary embodiment the stretch rod 5 must be moved downward farther than usual, the preform 2 used for the cleaning is longer than a usual preform. The mold 1 has a closable opening 16 in its bottom 10, which opening must be opened prior to starting the cleaning operation.

In order to avoid the need for a modified mold and a special preform as illustrated in FIG. 2b, it is also possible to use an additional "collar" (extension tube insert) 17, disposed between the preform 2 and the forming and filling station 3, for the CIP cleaning, as illustrated in FIG. 2c.

FIGS. 3a and 3b illustrate a third exemplary embodiment of an inventive stretching rod, which differs from those of the exemplary embodiments of FIGS. 1 and 2 in that the stretching rod 5 has no circumferential groove. However, in this embodiment, the housing of the drive unit is extended upward such that the stretching rod 5 can be moved upward above its starting position, to the extent that it is no longer in contact with the seal 12. CIP cleaning is again possible by introducing a cleaning medium through the filling material line 4 or through the cleaning line 14 leading to the drive chamber 11, or a combination thereof. In the exemplary embodiment according to FIG. 3a, an ordinary preform 2 is used for collecting the cleaning medium. In the exemplary embodiment according to FIG. 3b, instead of being connected to a preform, the form-and-fill head 3 is connected to a separate cleaning cap 24, through which the cleaning medium is collected, and said cleaning medium can be passed through the drain line 25 to a collecting container (not shown) or can be recirculated in a circulation loop. Such cleaning caps can be used with any of the described embodiments of the invention, instead of preforms, with the configuration of the cleaning cap being adjusted to the position of the stretch rod in the cleaning position. It is also possible to employ special preforms having drain means for the cleaning medium.

If and to the extent that the preform is employed in the mold as a holding element, an opening may be provided in the mold, for drainage.

The embodiment of the inventive stretch rod illustrated in FIG. 4a has an elastic membrane 18 as a seal, which separates the drive chamber 11 from the regions of the form-and-fill head 3 which guide the filling material. The membrane 18 is applied such that, when the stretch rod 5 is in its starting position, the membrane is un-stressed but is substantially fold-free (FIG. 4a).

Figure 4B:
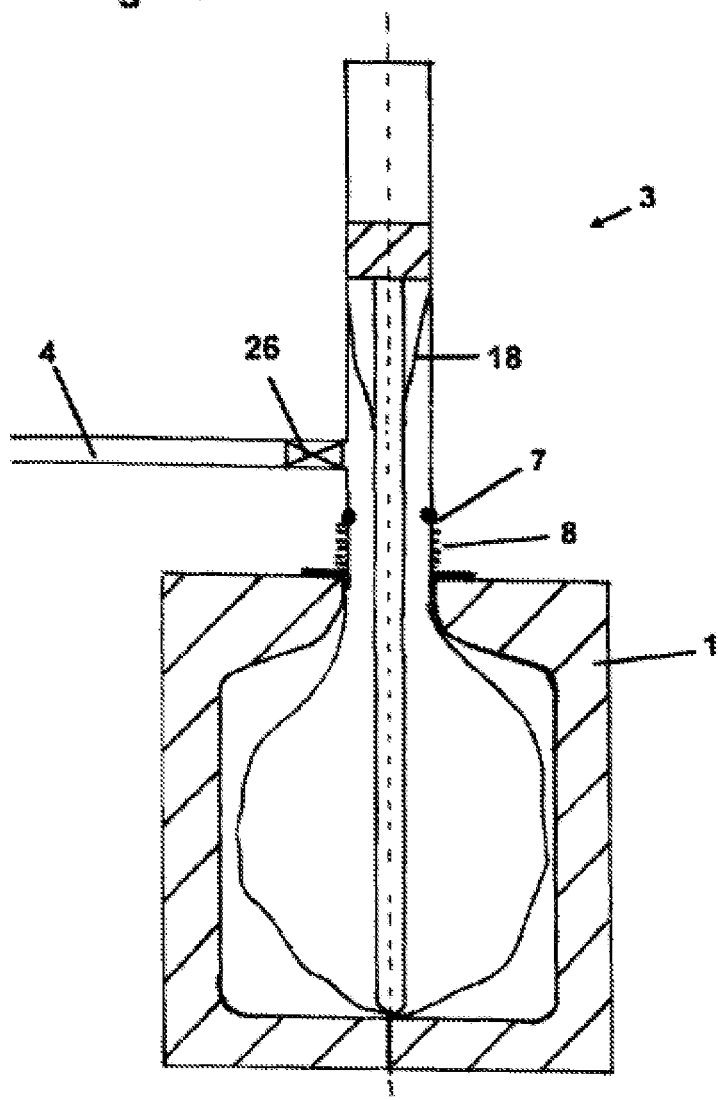

In FIG. 4b the stretch rod 5 is shown in its end position. The membrane is under stress. In both positions, it is possible to carry out cleaning in a CIP process. Here the cleaning medium is introduced through the filling material line 4.

FIG. 5 illustrates still another embodiment of a stretching rod 5 according to the invention, in which the sealing against the working chamber 11 is accomplished via a "lip seal" 19. The seal 19 is pressure-resistant on one side and from the other side it is permeable at a relatively low pressure. With a forming and filling pressure of up to 40 bar, the seal 19 will seal effectively to protect the drive chamber 11. For cleaning, the valve 15 is opened and a cleaning medium is fed through the cleaning line 14 at a cleaning pressure of up to 2 bar. From the side of the drive chamber 11, the seal 19 does not withstand this pressure and allows flow. The cleaning medium can flow through the seal 19 and can clean all areas.

Figure 6A:
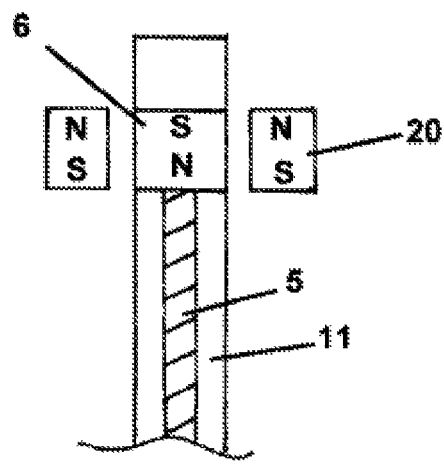
FIGS. 6a to 6d illustrate schematically a drive unit for an inventive stretch rod.

To make it possible for the drive chamber 11 to itself be cleaned and disinfected in an easy manner, the part of the drive means 6 of the stretch rod 5 in the chamber 11 should have a structure which is maximally simple and easy to clean. FIG. 6a illustrates an embodiment of a drive unit for a stretch rod, wherein a magnet 6 is disposed on the upper end of the stretch rod 5, which magnet is located within an external magnetic field which can be varied. This variable magnetic field may be generated, e.g., by magnets 20 disposed outside the chamber 11, which magnets may be moved up and down.

Figure 6B:
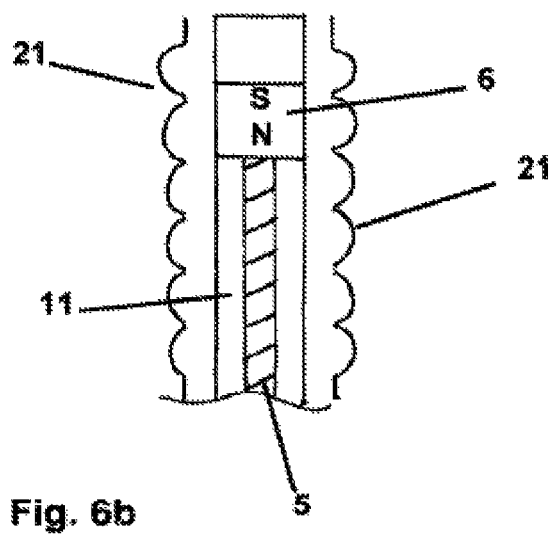

This external magnetic field may also be generated by a coil arrangement 21, as illustrated in FIG. 6b, with the coils therein producing magnetic fields which are variable by means of different signals, and which control the movement of the drive element 6 and thereby the stretch rod 5. Advantageously, in application of the principle of a linear motor, the magnetic element 6 on the stretch rod 5 may be employed as the driven element, for which a permanent magnet may be used, whereas coil elements may be used for the variable magnetic stator.

Figure 6C:
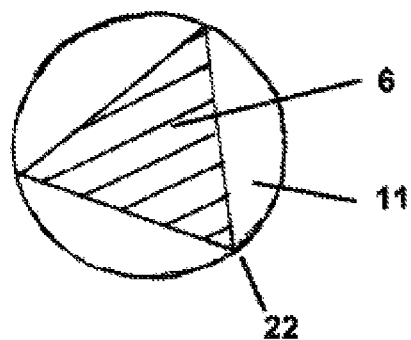

FIG. 6c illustrates, in an axial cross section, an exemplary embodiment comprising a magnet 6 disposed on the end of the stretch rod, in the drive chamber 11. The magnet 6 is triangular, wherewith only its corners 22 are in contact with the path in the chamber in which it moves; accordingly, it does not present any appreciable surface area which is not accessible to CIP cleaning. A cleaning medium can be caused to flow around the magnet 6.

Figure 6D:
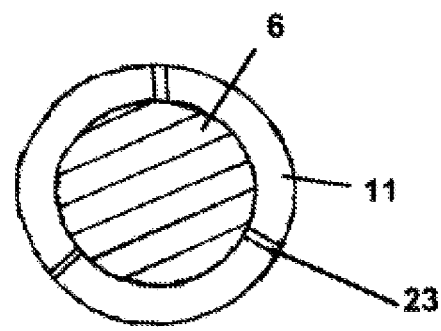

FIG. 6d illustrates a magnet 6 which is held in its path of movement by small spacers 23. Preferably three such spacers are employed (as illustrated in this exemplary embodiment), because this arrangement is sufficient to hold the magnet 6 without entailing an excessive amount of contact surface.

Figure 7A:
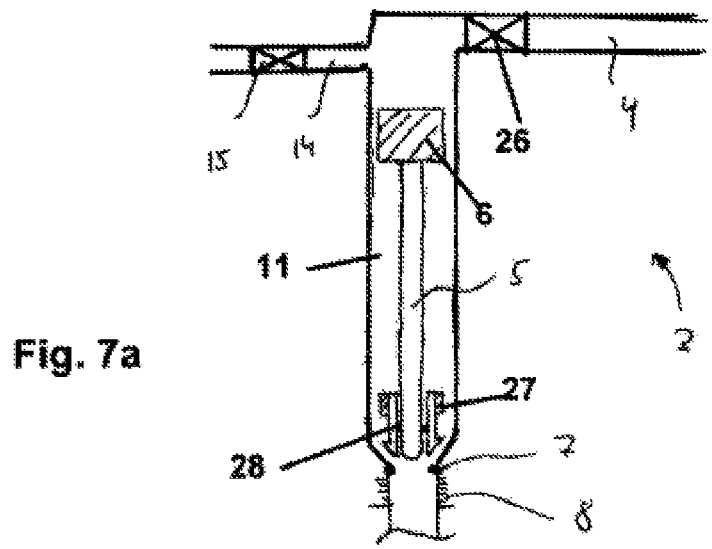
FIGS. 7a and 7b illustrate schematically yet another embodiment of an inventive stretch rod, in a cross sectional view.
Figure 7B:
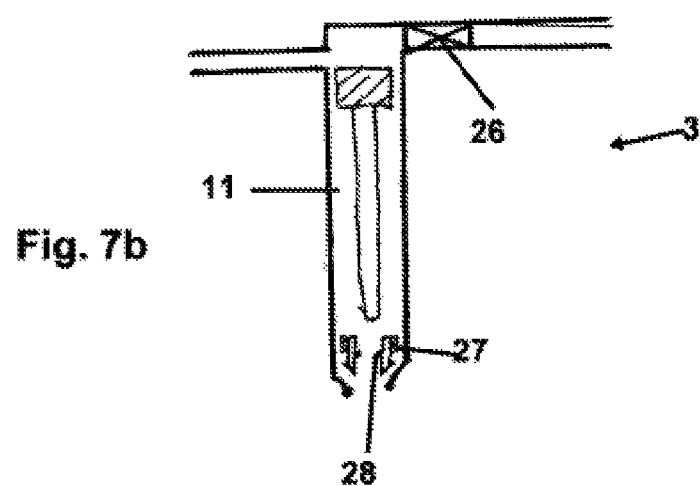

FIGS. 7a and 7b illustrate still another embodiment of a stretch rod 5 in a form-and-fill head 3. Here the filling material is fed via a feed line 4 which can be closed off by a valve 26. The stretch rod 5 is disposed within the flow path, and during the filling process it is surrounded by the filling material. The stretch rod is driven by a drive element 6 which is coupled to a drive unit (not shown) disposed outside the flow path. Suitable drive possibilities have been described above in connection with FIG. 6. Alternatively, it is possible to drive the stretch rod 5 by pneumatic means.

On its lower end, the stretch rod 5 has a sealing sleeve 27 which is movably (slidably) disposed on the stretch rod 5 and is sealable by the seal 28. The sealing sleeve 27 can be driven by a drive unit, similarly to the stretch rod 5, which drive unit has a drive element which is fixed to the sealing sleeve 27, which drive element is coupled to a drive unit (drive means) disposed outside the flow path. The coupling may advantageously be by magnetic means, as described above in connection with FIG. 6. Alternatively, the sealing sleeve may be driven by pneumatic means.

If the stretch rod is moved downward, together with the sealing sleeve 27, out of the position illustrated in FIG. 7a, the sealing sleeve 27 will seal the chamber 11 against the mouth 8 of the preform. A formed and filled container can be separated after the forming and filling from the form-and-fill head, and a new preform may be applied to the form-and-fill head. There will be no risk of filling material which is still present in the chamber 11 flowing out therefrom. The seal 28 seals the sealing sleeve against the stretch rod.

For carrying out the forming and filling process, the sealing sleeve is moved upward on the stretch rod 5. The outlet opening of the form-and-fill head is opened and made available, wherewith filling material can flow into the preform. The stretch rod 5 can be moved downward at the same time, where it can assist in the axial stretching of the preform.

The assembly can be cleaned without disassembling it, namely with movement of the stretch rod upward and out of the sealing sleeve (FIG. 7b). The seal 28 is then opened and a path through it is made available. Feeding of the filling material through the feed line 4 can be blocked via the valve 26, and the cleaning medium can be fed via the cleaning line 14, by opening the valve 15. The in-flowing cleaning medium can be collected, as described above, by a preform disposed in the mold which preform may be provided with drain means. Alternatively, a special cleaning cap may be used, as described above.

The invention claimed is:

1. A form-and-fill head of a machine for simultaneously reshaping and filling a heated preform to produce a container filled with a liquid filling material, said form-and-fill head comprising:
    a stretch rod; and
    a drive unit connected to the stretch rod, said drive unit being configured to move the stretch rod such that the stretch rod stretches the heated preform axially during a forming and filling phase;
    wherein at least a part of the drive unit is arranged in a drive chamber, and
    wherein the drive chamber is sealed off from regions of the form-and-fill head that come into contact the liquid filling material during the forming and filling phase by a seal which surrounds and circumferentially contacts the stretch rod.

2. The form-and-fill head according to claim 1, wherein a sealing surface of the seal is in a fixed position relative to the drive chamber.

3. The form-and-fill head according to claim 2, wherein the seal is a cylindrical bellows, roll bellows, or expandable sleeve.

4. The form-and-fill head according to claim 1, wherein the stretch rod is axially movable relative to the seal, and for a cleaning process the stretch rod is movable into a position in which the stretch rod is not in contact with the seal.

5. The form-and-fill head according to claim 4, wherein the stretch rod has an encircling groove in a region which does not come into contact with the seal during the forming and filling phase.

6. The form-and-fill head according to claim 1, wherein the seal which surrounds and circumferentially contacts the stretch rod is pressure resistant on one side.

7. The form-and-fill head according to claim 6, wherein the seal is a lip seal.

8. The form-and-fill head according to claim 1, wherein the drive unit comprises a magnetic coupling comprising:
    a first magnet unit that disposed in the drive chamber and is connected to the stretch rod; and
    a second magnet unit that is disposed outside the drive chamber.

9. The form-and-fill head according to claim 8, wherein the second magnet unit is axially displaceable.

10. The form-and-fill head according to claim 8, wherein the second magnet unit is in a fixed position and a magnetic field of the second magnet is dynamically controllable.

11. The form-and-fill head according to claim 8, wherein the first magnet unit is supported at a distance from walls of the drive chamber.

12. The form-and-fill head according to claim 11, wherein the first magnet unit is supported at the distance from walls of the drive chamber by spacer means.

\* \* \* \* \*